(12) United States Patent
Pepper et al.

(10) Patent No.: US 11,100,041 B2
(45) Date of Patent: Aug. 24, 2021

(54) TECHNIQUES FOR TRACKING INDEPENDENT HARDWARE GRAPHICS PROCESSING UNIT (GPU) PERFORMANCE

(71) Applicant: Microsoft Technology Licensing, LLC, Redmond, WA (US)

(72) Inventors: Damyan Jonathan Pepper, Redmond, WA (US); Shawn Lee Hargreaves, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/917,287

(22) Filed: Mar. 9, 2018

(65) Prior Publication Data
US 2019/0278742 A1 Sep. 12, 2019

(51) Int. Cl.
| G06F 15/80 | (2006.01) |
| G06T 1/20 | (2006.01) |
| G06F 9/38 | (2018.01) |
| G06F 11/34 | (2006.01) |

(52) U.S. Cl.
CPC ........ *G06F 15/8015* (2013.01); *G06F 9/3887* (2013.01); *G06F 11/3414* (2013.01); *G06F 11/3428* (2013.01); *G06T 1/20* (2013.01); *G06F 11/3466* (2013.01)

(58) Field of Classification Search
None
See application file for complete search history.

(56) References Cited

U.S. PATENT DOCUMENTS

| 6,944,614 | B1 * | 9/2005 | Ramasamy | G06F 16/21 |
| 7,533,371 | B1 * | 5/2009 | Johns | G06F 11/323 |
| | | | | 345/419 |
| 7,580,938 | B1 * | 8/2009 | Pai | G06F 3/0482 |
| 7,659,897 | B1 * | 2/2010 | Azar | G06F 11/3428 |
| | | | | 345/501 |
| 9,262,039 | B1 * | 2/2016 | Joyce | G06F 3/0481 |
| 9,495,187 | B2 * | 11/2016 | Bingham | G06T 11/206 |
| 9,606,888 | B1 * | 3/2017 | Wiesner | G06F 11/3664 |
| 10,095,487 | B1 * | 10/2018 | Venkatesan | G06F 8/34 |
| 10,628,407 | B1 * | 4/2020 | Sosothikul | G06F 12/0269 |
| 10,725,889 | B2 * | 7/2020 | Chen | G06F 11/3604 |
| 2008/0143730 | A1 * | 6/2008 | Lindholm | G06F 9/3887 |
| | | | | 345/501 |

(Continued)

OTHER PUBLICATIONS

"International Search Report and Written Opinion Issued in PCT Application No. PCT/US2019/020175", dated May 23, 2019, 10 Pages.

*Primary Examiner* — Anh-Tuan V Nguyen
(74) *Attorney, Agent, or Firm* — Arent Fox LLP (57) ABSTRACT

Examples described herein generally relate to indicating resource utilization by a graphics processing unit (GPU). Data indicating a hierarchy of architectural units for executing processing threads on a GPU can be obtained. An indication of a slot assigned to a collection of threads for executing on the GPU can be received, where the slot is associated with a single instruction multiple data (SIMD) module capable of concurrently executing multiple collections of threads. An architectural unit to which the slot is assigned can be determined based on the data indicating the hierarchy of architectural units. An indication of the architectural unit as executing the collection of threads can be outputted.

15 Claims, 5 Drawing Sheets

(56) References Cited

U.S. PATENT DOCUMENTS

| | | | | |
|---|---|---|---|---|
| 2008/0148190 A1* | 6/2008 | Schaff | ............... | G06F 3/0482 715/853 |
| 2009/0144665 A1* | 6/2009 | Bernstein | ............ | G06F 3/0481 715/853 |
| 2009/0177863 A1* | 7/2009 | Rehman | ............ | H04L 12/6418 712/30 |
| 2010/0211754 A1* | 8/2010 | Crosby | ............... | G06F 11/366 711/170 |
| 2010/0318852 A1* | 12/2010 | Zheng | ............... | G06F 11/3664 714/37 |
| 2011/0099550 A1 | 4/2011 | Shafi | | |
| 2011/0161642 A1* | 6/2011 | Eichenberger | ...... | G06F 9/30076 712/241 |
| 2012/0019542 A1* | 1/2012 | Shah | ..................... | G06T 1/20 345/522 |
| 2012/0162265 A1* | 6/2012 | Heinrich | ............ | G06F 3/04883 345/661 |
| 2012/0272224 A1* | 10/2012 | Brackman | ............... | G06F 8/54 717/151 |
| 2013/0055166 A1* | 2/2013 | Stinger | ............... | G06F 3/0482 715/853 |
| 2013/0113801 A1* | 5/2013 | Monson | ............... | G06T 15/06 345/426 |
| 2014/0282175 A1* | 9/2014 | Smith | .................. | G06F 16/248 715/771 |
| 2015/0178089 A1* | 6/2015 | Brunheroto | .......... | G06F 9/3851 712/215 |
| 2017/0116297 A1* | 4/2017 | Wittenburg | .............. | G06T 1/60 |
| 2017/0295379 A1* | 10/2017 | Sun | ..................... | H04N 19/44 |
| 2018/0032431 A1* | 2/2018 | Ray | ..................... | G06F 12/0646 |
| 2018/0210732 A1* | 7/2018 | Zhu | ..................... | G06F 15/78 |
| 2018/0213232 A1* | 7/2018 | Du | ...................... | H04N 19/48 |
| 2018/0307606 A1* | 10/2018 | Ray | ..................... | G06T 1/60 |
| 2018/0315159 A1* | 11/2018 | Ould-Ahmed-Vall | ...................... | G06N 3/063 |

\* cited by examiner

TECHNIQUES FOR TRACKING INDEPENDENT HARDWARE GRAPHICS PROCESSING UNIT (GPU) PERFORMANCE

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. GPUs can typically perform rasterization operations to draw the images based on rendering instructions and/or ray tracing to emulate photons of light sent out via rays and to determine where light reflects, trace a point where the light returns from the scene, etc. to generate the images.

Tools have been developed for tracking GPU performance in real-time or by playing back previously provided GPU commands to cause generation of images. Typically these tools are tied to the type of GPU being tracked and are often developed by the manufacturer of the GPU and/or corresponding graphics driver. Certain computing environments, however, may allow for utilization of GPUs supplied by different independent hardware vendors, which may require specific tools developed by each independent hardware vendor to facilitate accurate tracking of GPU performance.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for indicating resource utilization by a graphics processing unit (GPU) is provided. The method includes obtaining, for the GPU, data indicating a hierarchy of architectural units for executing processing threads on the GPU, receiving an indication of a slot assigned to a collection of threads for executing on the GPU, wherein the slot is associated with a single instruction multiple data (SIMD) module capable of concurrently executing multiple collections of threads, determining, based on the data indicating the hierarchy of architectural units, an architectural unit to which the slot is assigned, and displaying, via an interface, an indication of the architectural unit as executing the collection of threads.

In another example, a computing device for indicating resource utilization by a GPU is provided. The computing device includes a memory storing one or more parameters or instructions for executing an operating system and one or more applications including a tracking application, and at least one processor coupled to the memory. The at least one processor is configured to obtain, for the GPU, data indicating a hierarchy of architectural units for executing processing threads on the GPU, receive an indication of a slot assigned to a collection of threads for executing on the GPU, wherein the slot is associated with a SIMD module capable of concurrently executing multiple collections of threads, determine, based on the data indicating the hierarchy of architectural units, an architectural unit to which the slot is assigned, and display, via an interface, an indication of the architectural unit as executing the collection of threads.

In another example, a computer-readable medium, including code executable by one or more processors for indicating resource utilization by a GPU is provided. The code includes code for obtaining, for the GPU, data indicating a hierarchy of architectural units for executing processing threads on the GPU, receiving an indication of a slot assigned to a collection of threads for executing on the GPU, wherein the slot is associated with a SIMD module capable of concurrently executing multiple collections of threads, determining, based on the data indicating the hierarchy of architectural units, an architectural unit to which the slot is assigned, and displaying, via an interface, an indication of the architectural unit as executing the collection of threads.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to tracking performance of a graphics processing unit (GPU). In these examples, a computing device can be configured to track performance of GPUs independent of a hardware vendor supplying the GPU and the specific architecture of the GPU. For example, architectural data regarding an architecture of the GPU can be obtained by a tracking application, and used to associate threads of execution tracked on the GPU with specific architectural units described in the architectural data. In addition, an interface can be used to display information from the tracking to visualize GPU resource utilization. For example, the interface can be generated based on the architectural data, and resource utilization for specific architectural units can be represented on the interface based on associating received tracking information with the architectural units of the GPU. In addition, for example, this can allow the manufacturer of the GPU (also referred to as the hardware vendor) to specify nomenclature for different architectural units, and this nomenclature can be used in the interface that displays GPU resource utilization. This can provide a consistent and efficient GPU resource tracking interface for different instances of the same GPU, e.g., to allow a normalized performance comparison across different GPUs, but may allow variation in architecture, nomenclature, etc., via transformation of different architecture data to provide interoperability of the tracking application and/or the corresponding interface with different GPUs from the same or different manufacturer.

Figure 1:
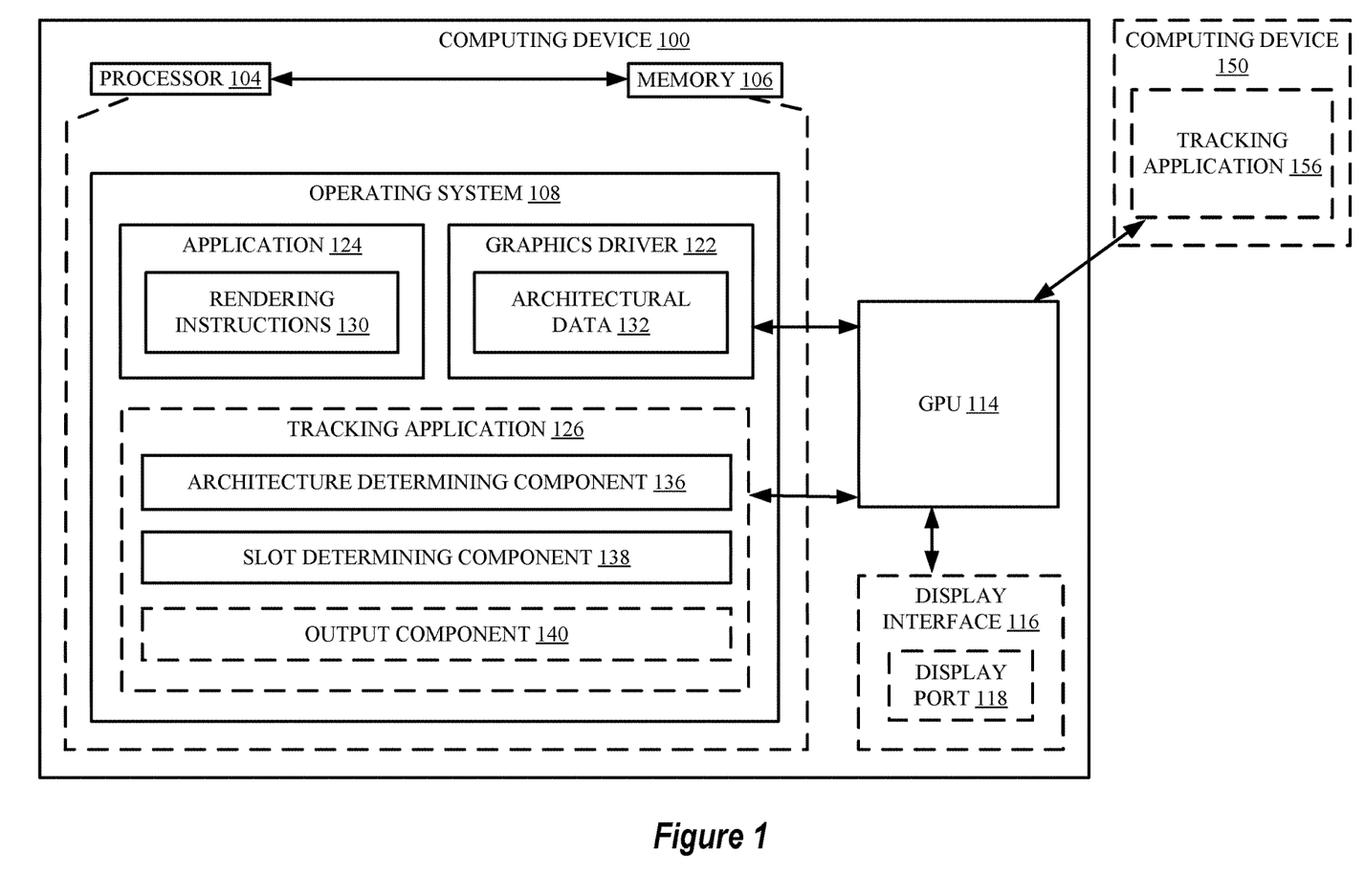
FIG. 1 is a schematic diagram of an example of a computing device for tracking performance of a graphics processing unit (GPU) in accordance with examples described herein.
Figure 2:
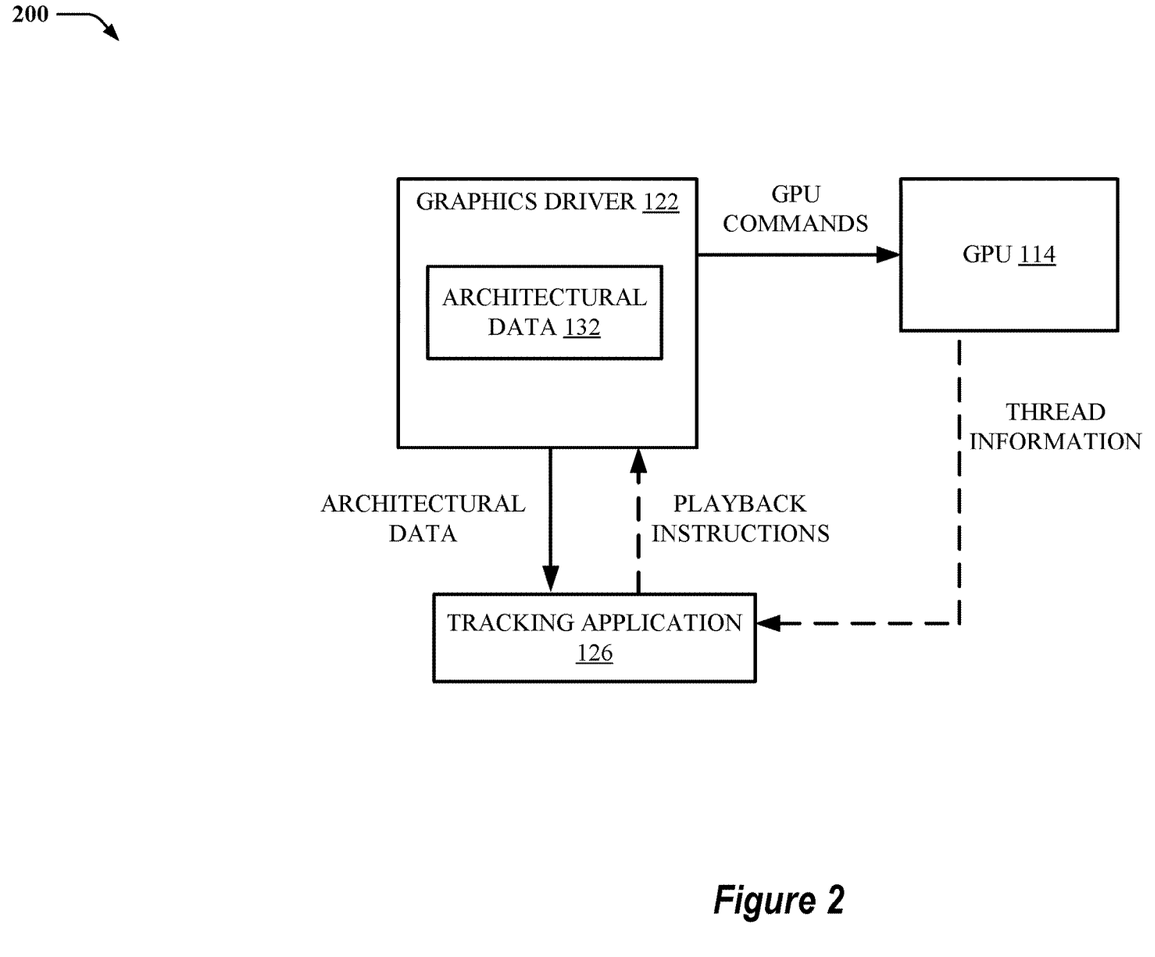
FIG. 2 is an example of a data flow diagram used in tracking GPU performance in accordance with examples described herein.
Figure 3:
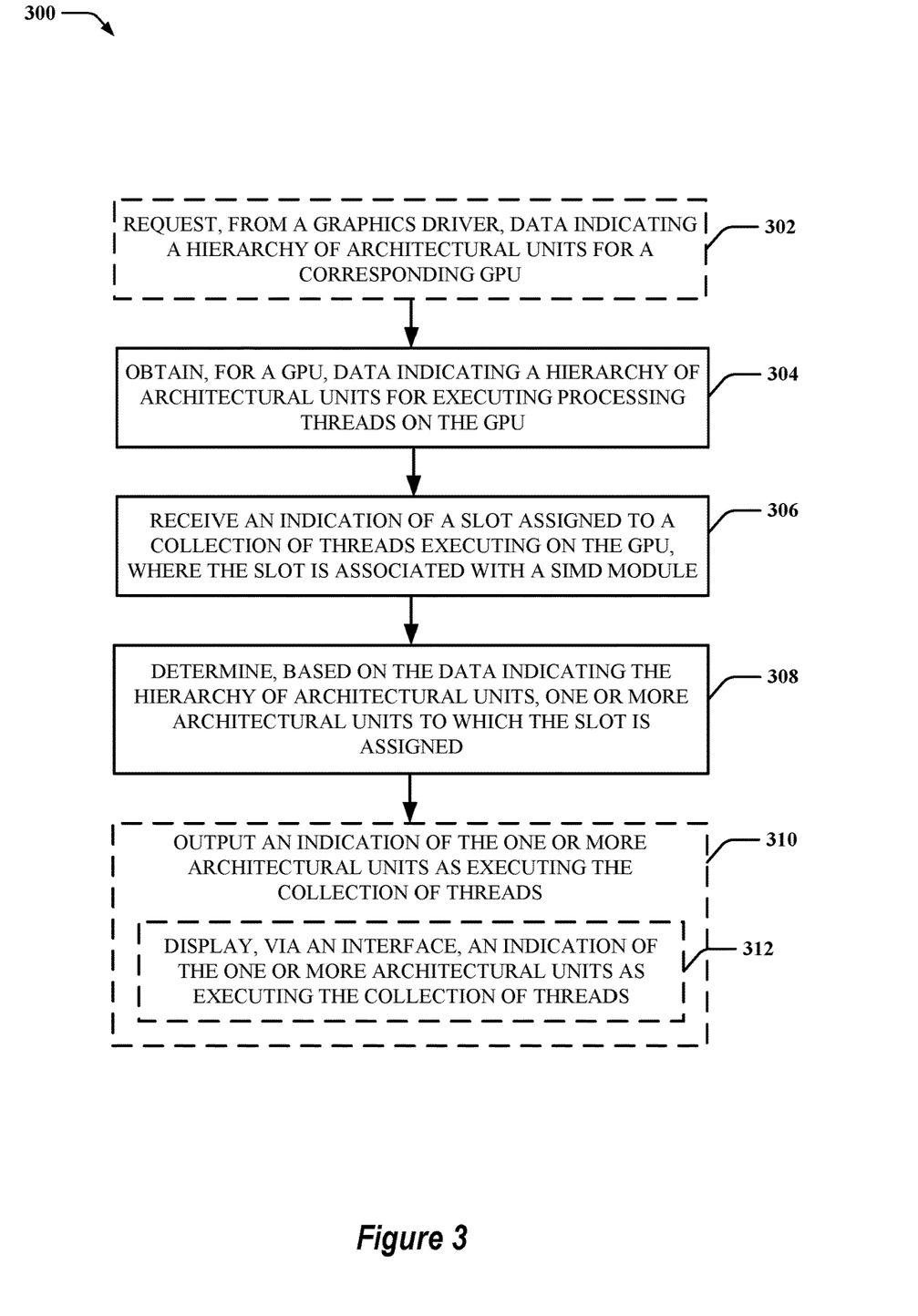
FIG. 3 is a flow diagram of an example of a method for tracking GPU performance based on received architectural data in accordance with examples described herein.

Turning now to FIGS. 1-5, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for tracking GPU performance in rendering graphics. For example, computing device 100 can include or can otherwise be coupled with a processor 104 and/or memory 106, where the processor 104 and/or memory 106 can be configured to execute or store instructions or other parameters related to facilitating tracking performance of a GPU, as described herein. Computing device 100 can execute an operating system 108 (e.g., via processor 104 and/or memory 106) for providing an environment for executing one or more applications. The computing device 100 can also include a GPU 114 for processing rendering instructions, and/or communicating associated commands to a display interface 116 to cause display of one or more images on a display, which may be coupled to the computing device 100 via a display port 118.

In an example, display interface 116 can be communicatively coupled with the processor 104 and/or memory 106 for communicating with a display (not shown) via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and the display.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116. In an example, GPU 114 can support ray tracing, rasterization, or other mechanism for generating an image based on received rendering instructions.

In one example, an application 124 can operate (e.g., via operating system 108) to generate images for displaying via display interface 116. Application 124 may generate rendering instructions 130 for rendering an image, where the rendering instructions 130 may define geometry for an image related to ray tracing the image, rasterizing the image, etc. In one example, application 124 can generate the rendering instructions 130 using an application programming interface (API) provided by the graphics driver 122 that allows for defining image geometry. The graphics driver 122 can generate GPU-specific commands based on the rendering instructions to facilitate rendering of the image via GPU 114. In an example, the graphics driver 122 can generate the GPU-specific commands and provide to the GPU 114 in a separate thread of execution, and the GPU 114 can execute the commands in a different time domain than the generation and providing of the rendering instructions 130 to the graphics driver 122 (e.g., at some indeterminable time after generation/providing of the rendering instructions 130), which can be referred to as deferred execution.

In an example, computing device 100 can include a tracking application 126 for tracking performance of the GPU in rendering graphics. In an example, the tracking application 126 can be operable to track performance of different GPUs from different manufacturers. In this example, the graphics driver 122 can provide architectural data 132 of the GPU 114 to the tracking application 126 to facilitate tracking the operations as specific to the GPU 114 hardware architecture. For example, architectural data 132 may include an indication of one or more architectural units of the GPU 114, which may include a hierarchy of architectural units. For example, GPUs can typically include a number of single instruction multiple data (SIMD) modules that function to execute collections of threads of operations. In an example, each collection of threads can include a number of threads executing the same instructions on different data (e.g., in parallel operation), and each collection can include a configured number of threads (e.g., 32 threads, 64 threads, etc.). The collections of threads can be referred to as a "warp" or a "wave" in different GPU architectures.

Each SIMD module can execute a number of slots, where the slots are capable of executing a collection of threads (e.g., 10 slots for each SIMD module). Moreover, the GPU 114 can include layers of architecture that include the SIMD modules (e.g., as a last or lowest layer), such as a computational unit (CU) layer where each CU may include a number of SIMD modules (e.g., 4 SIMD modules), an engine layer where each engine can include a number of CUs (e.g., 1, 2, 3, 4, etc. CUs), and/or additional layers. In any case, the GPU 114 and graphics driver 122 may have substantially any hierarchical architectural format for employing the SIMD modules, and may use different nomenclature to describe each layer. Accordingly, graphics driver 122 can include architectural data 132 that defines the hierarchical architectural structure of the GPU 114, and can provide the architectural data 132 to the tracking application 126 to facilitate tracking performance of the GPU 114 based on the defined architecture and/or nomenclature.

In addition, for example, different GPU architectures may share hardware resources across groups of processing units at any level of the architecture. For instance, a set of shader registers may be shared across a group of SIMD modules, or a block of L0 cache memory might be shared across a group of CUs or engines, each of which can be in turn composed of multiple SIMD modules. This kind of hardware reuse can be important when attempting to optimize the execution speed of GPU programs, as it may be possible to encounter contention if multiple SIMD modules are competing for use of the same shared hardware execution resources. Based on the output of the tracking application 126, as described herein, a developer with expert knowledge of a specific GPU architecture may be able to use knowledge of how the workload is being distributed across these hardware units to identify performance bottlenecks where contention over shared resources may be limiting execution speed.

For example, tracking application 126 can include an architecture determining component 136 for determining the architectural layout of the GPU 114, which can be based on architectural data 132 received from a graphics driver 122 or other source, a slot determining component 138 for obtaining information regarding a slot of a SIMD module that is assigned to execute a collection of threads, and/or an optional output component 140 for outputting an indication tracked performance metrics for one or more architectural units of the GPU 114 based on the slot assignment and the architectural data 132. In one example, output component 140 can output the indication to an interface (e.g., on a display) to allow a developer to track GPU performance within the units of architecture during a specific period of time.

In an example, tracking application 126 may execute on the same computing device 100 or as tracking application 156 operating on a different computing device 150 (where the different computing device 150 can have a separate processor, memory, operating system, etc. to execute the tracking application 156) so long as the tracking application 126, 156 can at least communicate with GPU 114, graphics driver 122, or a related component (e.g., via an API), to obtain GPU tracking information, such as collection of thread information (e.g., slot assignments), data related to an architecture of a GPU being tracked, and/or the like. Though the components are only shown in tracking application 126 in FIG. 1, tracking application 156 when configured to operate on a different computing device 150 can include the similar or same components to achieve similar or same functionality as described herein for the tracking application 126.

FIG. 2 illustrates an example of a data flow 200 of architectural data, thread information for GPU processing, etc., for tracking GPU performance. Data flow 200 can be effectuated on a system architecture, such as computing device 100 shown in FIG. 1, and is thus described in conjunction with FIG. 1 in a non-limiting example.

For example, the graphics driver 122 can provide GPU commands to the GPU 114 to effectuate rendering of images. For example, the graphics driver 122 can generate the GPU commands based on rendering instructions for the images provided by one or more applications (e.g., rasterization instructions, ray tracing instructions, etc.), and the GPU 114 can accordingly render images for display on a display device. In an example, graphics driver 122 can also include the architectural data 132 defining an architecture of the GPU 114, which may include a hierarchical representation defining a hierarchy of architecture including one or more layers, each layer associated with another layer, a SIMD module, etc. For example, the architectural data 132 may define the hierarchical representation of the GPU 114 architecture by using hierarchical data structures, such as nested extensible markup language (XML) tags or substantially any representation from which the hierarchy may be determined. The architectural data 132 may also include an indication of a number of slots a given SIMD module can handle and/or an indication of slots assigned to each SIMD module in the architecture, etc.

In any case, the architectural data 132 can be provided to the tracking application 126 so that the tracking application 126 can determine the architecture of the GPU 114 and/or the nomenclature used to define the various layers in the architecture. In this regard, the tracking application 126 can determine and output tracking information as it relates to the architecture of the GPU 114 and/or using the nomenclature defined in the architectural data 132. In this regard, for example, the architectural data can include labels for the various architectural units or layers of units to allow for generating an interface or other output that uses the labels to provide the desired nomenclature for the architecture of the GPU 114. This can allow the tracking application 126 to work with different GPUs from different manufacturers to provide tracking and resource utilization information for the GPU using terms and/or depictions that are consistent with the defined architecture.

In addition, tracking application 126 can receive thread information from the GPU 114 to facilitate tracking GPU operations. In an example, tracking application 126 may receive the thread information from the GPU 114 directly and/or through an intermediate component, such as the graphics driver 122, etc. In an example, the tracking application 126 may register a callback function with the GPU 114 (and/or graphics driver 122) to receive the thread information. Alternatively, for example, the GPU 114 may write the thread information into a region of memory (e.g., memory 106) from where it can later be retrieved by the tracking application 126. For example, the GPU 114 can report thread information for one or more collections of threads, including an assigned slot for a given collection, a start time for execution of the collection, an end time for execution of the collection, memory utilization by the collection, etc., and may do so each time a collection of threads is assigned to a slot and/or is being executed in the slot, etc. For example, the thread information can include a slot identifier, and the tracking application 126 can use the slot identifier to determine a SIMD module, and related instances of other units of architecture, assigned to the slot.

Moreover, in an example, GPU 114 can provide the thread information to the tracking application 126 in real-time execution to generate the image data and/or as part of playing back previously provided rendering instructions. In the latter case, for example, tracking application 126 can provide the playback instructions to the graphics driver 122 to allow a developer to playback certain rendered images/scenes to track GPU resource utilization during rendering. In one example, tracking application 126 can capture the rendering instructions for playback.

FIG. 3 is a flowchart of an example of a method 300 for tracking independent hardware GPU performance based on corresponding architectural data. For example, method 300 can be performed by the computing device 100, and is accordingly described with reference to FIGS. 1 and 2, as non-limiting examples of environments for carrying out method 300.

In method 300, optionally at action 302, data indicating a hierarchy of architectural units can be requested, from a graphics driver, for a corresponding GPU. In an example, architecture determining component 136, e.g., in conjunction with processor 104, memory 106, tracking application 126, 156, etc., can request, from the graphics driver (e.g., graphics driver 122), data indicating a hierarchy of architectural units (e.g., architectural data 132) for a corresponding GPU (e.g., GPU 114). For example, architecture determining component 136 can request the architectural data 132 from the graphics driver 122 using an API provided by the graphics driver 122 and/or the like. In another example, tracking application 126/156 may define various instances of GPU architectural data, and architecture determining component 136 may request architectural data based on an identifier of the GPU 114 (which may be received from graphics driver 122).

In any case, at action 304, data indicating a hierarchy of architectural units for executing processing threads on a GPU can be obtained for the GPU. In an example, architecture determining component 136, e.g., in conjunction with processor 104, memory 106, tracking application 126, 156, etc., can obtain, for the GPU (e.g., GPU 114), the data indicating the hierarchy of architectural units (e.g., architectural data 132) for executing processing threads on the GPU (e.g., GPU 114), where the data can be obtained from the graphics driver 122 (e.g., based on a request thereto or otherwise, as described above). The architectural data, as described, may indicate one or more layers of architecture for executing various SIMD modules to execute the processing threads on the GPU 114. For example, the GPU 114 can be capable of executing many processing threads, and can execute collections of threads in parallel operation, as described above. Thus, for example, the architectural data 132 can indicate information regarding one or more hierarchical layers of architecture that are defined to include the SIMD modules, such as a CU layer where each CU may include a number of SIMD modules, an engine layer where each engine can include a number of CUs, etc.

Thus, in one example, the architectural data 132 can indicate the hierarchical architecture using a hierarchical data structure, such as nested XML tags where the tags may include a tag level for engine layer, within which the engines can be defined, and each engine may include a tag level for CU layer, within which the CUs for each engine can be defined, and each CU may include a tag level for SIMD module layer, within which the SIMD modules for each CU can be defined, etc. In another example, the architectural data 132 may include a list of units of architecture, and a number of instances of other units of architecture included (e.g., a list of engines each indicating a number of CUs in the engine, etc.). Moreover, the architectural data 132 may include nomenclature used to describe each layer such that the tracking application 126/156 can determine and use the preferred nomenclature in reporting performance for a given GPU. In addition, the architectural data 132 may indicate a number of slots and/or specific slot identifiers associated with each SIMD module. In either case, given a slot identifier, the architectural data 132 can enable the tracking application 126/156 to determine a SIMD module related to the slot and/or corresponding other higher-level units of architecture corresponding to the SIMD module.

In method 300, at action 306, an indication of a slot assigned to a collection of threads executing on the GPU can be received, where the slot is associated with a SIMD module. In an example, slot determining component 138, e.g., in conjunction with processor 104, memory 106, tracking application 126, 156, etc., can receive the indication of the slot assigned to the collection of threads executing on the GPU (e.g., GPU 114), where the slot is associated with a SIMD module. For example, slot determining component 138 can receive the indication of the slot from the GPU 114 (e.g., via one or more intermediate components, such as graphics driver 122, or otherwise) based on executing of the collection of threads in the slot. For example, GPU 114 (and/or graphics driver 122) can dispatch a collection of threads to execute in a slot, where a given slot can be assigned to a SIMD module in the GPU 114. For example, the collection of threads may be related to executing a shader or other process to modify characteristics of an image (e.g., such as shading by applying an operation to one or more pixels of the image, etc.). In some examples, shaders can be designed for other purposes as well that may or may not relate to an image being rendered, but may execute multiple instances (e.g., for multiple data) of the same instruction (e.g., single instruction) via the SIMD module.

In one example, slot determining component 138 may receive a slot identifier or index for the collection of threads, a start time for the collection, end time for the collection, memory utilized by the collection, etc., from GPU 114. As described, this may be part of an initial execution of the rendering instructions from an application, playback of rendering instructions already processed and performed by the GPU 114, and/or the like. In any case, the indication of the slot assignment (and/or associated thread information) can assist in determining GPU performance metrics and/or resource utilization for providing on an interface or other output, as described herein.

In method 300, at action 308, one or more architectural units to which the slot is assigned can be determined based on the data indicating the hierarchy of architectural units. In an example, architecture determining component 136, e.g., in conjunction with processor 104, memory 106, tracking application 126, 156, etc., can determine, based on the data indicating the hierarchy of architectural units, the one or more architectural units to which the slot is assigned. For example, architecture determining component 136 can determine, based on architectural data 132, which SIMD module executes instructions in the slot, and/or can determine which instances of additional layers of architecture include the SIMD module. In one example, the architectural data 132 may include an indication of slot indices assigned to the SIMD modules and/or a number of indices assigned to a given SIMD module from which architecture determining component 136 can determine the indices associated with each module.

For example, where the architectural data 132 (or other known or obtained data) indicates that each SIMD module handles 10 slots, architecture determining component 136 can determine a first SIMD module handles slot indices 0-9, a second SIMD module handles slot indices 10-19, and so on. In this example, the first SIMD module can be a first SIMD module (e.g., SIMD module 0) of a first CU (e.g., CU 0), in a first engine (e.g., engine 0), etc., as described further herein. Similarly, in this example, the second SIMD module can be the second SIMD module (e.g., SIMD module 1) for the first CU in the first engine, and so on continuing per SIMD module per CU, and per CU per engine depending on the number of SIMDs in each CU and the number of CUs in each engine (and/or the number of engines in each higher layer and so on). In any case, the architectural data 132 can be sufficient such that architecture determining component 136 can determine the various architectural units related to a give slot reported by the slot indication from the GPU 114.

In method 300, optionally at action 310, an indication of the one or more architectural units, as executing the collection of threads, can be output. In an example, output component 140, e.g., in conjunction with processor 104, memory 106, tracking application 126, 156, etc., can output the indication of the one or more architectural units as executing the collection of threads. As described, architecture determining component 136 can determine the one or more architectural units associated with the slot identifier corresponding to the collection of threads, and output component 140 can output an indication of that architectural unit (e.g., SIMD module) and/or other architectural units corresponding to layers above the SIMD module. In an example, output component 140 can output the indication on a display, though other mechanisms for outputting the indication are possible as well (e.g., to a log, an audio alert or other feedback, etc.). In addition, output component 140 can output the indication along with an indication of a period of time during which the architectural unit is or did execute the collection of threads. Moreover, in an example, output component 140 can output multiple indications of multiple different architectural units executing different collections of threads during similar periods of time to provide an interface indicating the various architectural units of the GPU 114 that are in use during the period of time (and/or an instant in time).

In one example, in outputting the indication at action 310, optionally at action 312, the indication of the one or more architectural units can be displayed, via an interface, as executing the collection of threads. In an example, output component 140, e.g., in conjunction with processor 104, memory 106, tracking application 126, 156, etc., can display, via the interface, the indication of the one or more architectural units as executing the collection of threads. For example, output component 140 can graphically depict, on the interface, a representation of the various architectural units of the GPU 114, as indicated in the architectural data 132, along with the indication of the architectural unit executing the collection of threads. For example, output component 140 can depict the indication during a period of time or at an instant in time related to executing the collection of threads based on the slot indication and/or other information received from the GPU 114. Moreover, for example, output component 140 can generate the interface using the nomenclature for various layers of architecture as defined in the architectural data 132.

Figure 4:
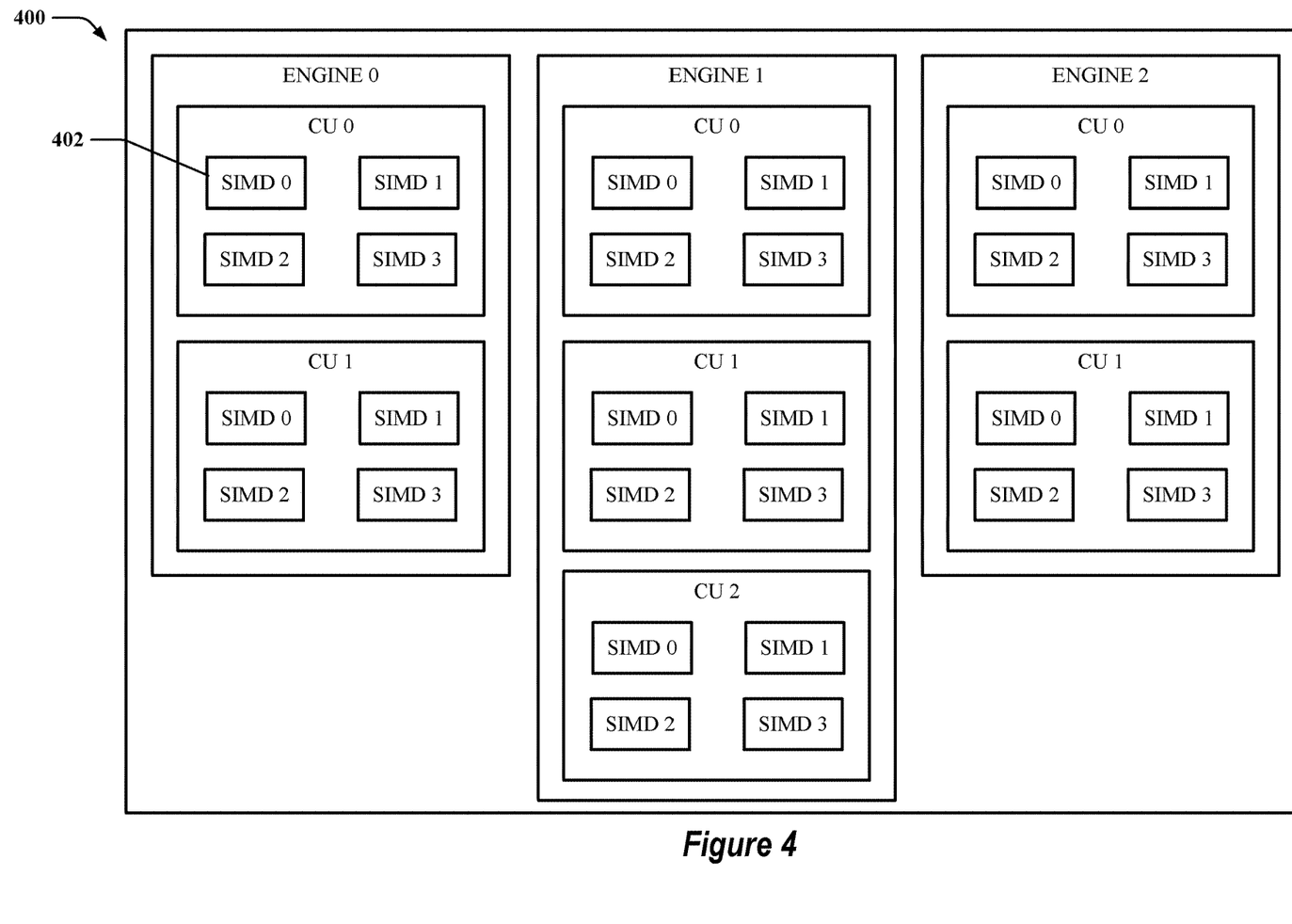
FIG. 4 illustrates an example of an interface for displaying a representation of a GPU architecture and/or resource utilization by various architectural units in accordance with examples described herein.

An example of an interface is shown in FIG. 4, which illustrates an interface 400 for displaying an architecture of a GPU based on received architectural data. For example, the interface 400 graphically represents the architecture of a GPU as including a plurality of SIMD modules 402 within additional layers of hierarchical architecture, including a CU layer and an engine layer, such that each SIMD module can be associated with an engine and a corresponding CU. As described, additional layers may be used and/or a different nomenclature can be used. In any case, the additional layers and/or nomenclature can be specified in the architectural data for the GPU 114 (e.g., received in architectural data 132 from a graphics driver 122), and can be accordingly represented on the interface 400. In addition, each SIMD module can be correlated with multiple slots that can be used to execute collections of threads. The architectural data may indicate which slots correspond to which SIMD modules and/or a number of slots per SIMD module so the corresponding slots can be determined.

Thus, in an example, output component 140 can output an interface similar to interface 400 and can include indications of the SIMD modules (and/or of the corresponding CU, engine, or other higher layer) executing collections of threads on the interface 400 at certain periods or instants of time. For example, output component 140 can highlight a SIMD module (or multiple SIMD modules—and/or multiple ones of the corresponding CU(s), engine(s), etc.) in use during a period of time at which the GPU 114 is executing GPU commands using collections of threads assigned to a slot in the SIMD module. For example, the output component 140 can highlight the representation of SIMD modules and/or other corresponding architectural units being used (e.g., by changing a color, shading, etc.). In another example, output component 140 can depict a graph of utilization in each box representing a SIMD module to show a level of resources utilized by a given SIMD module. Moreover, in other examples of interfaces, output component 140 may include a plurality of bar graphs each corresponding to a SIMD module, and associated with higher layers of corresponding architectural units, where each bar graph shows SIMD utilization (e.g., memory resources being utilized) at a given period or instant in time (or other utilization metrics corresponding to the related higher layer architectural unit(s)). In any case, displaying such interfaces can allow a developer to view GPU resource utilization when executing certain rendering instructions to determine whether improvements can be made to spread utilization out over additional SIMD modules, corresponding CUs or engines, etc. Moreover, the interfaces can use the nomenclature that is appropriate for the corresponding GPU, which can assist the developer in better understanding which architectural units are employed in executing the rendering instructions.

Figure 5:
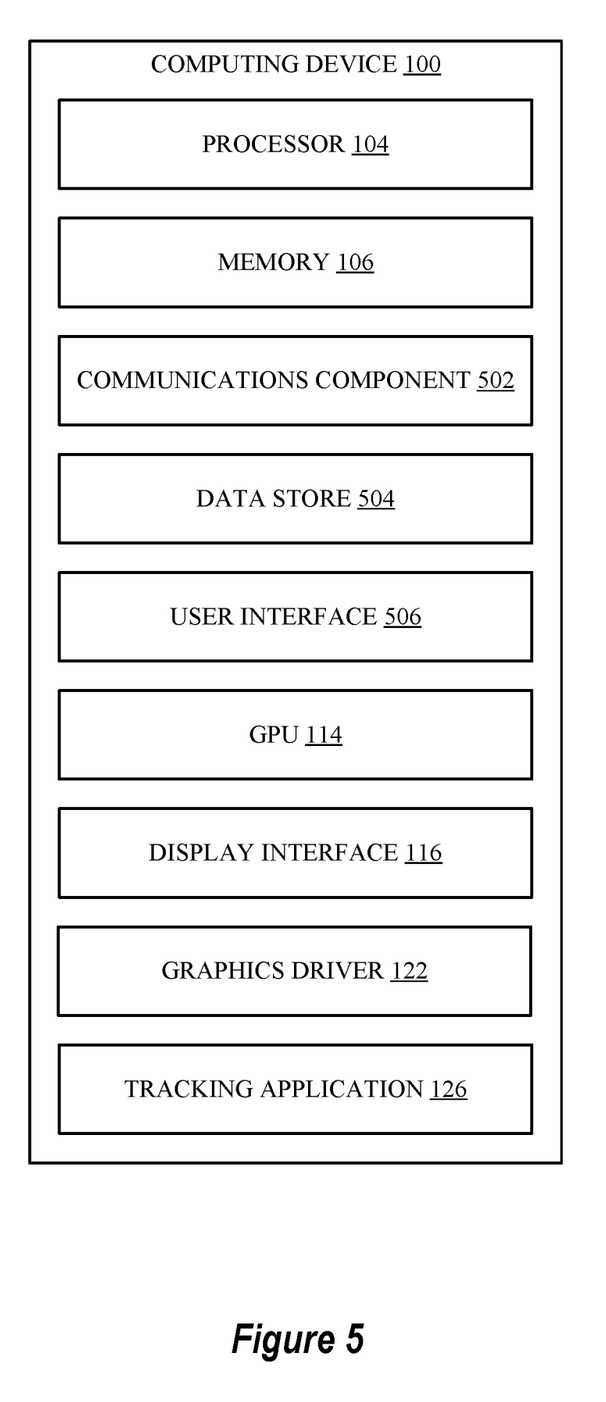
FIG. 5 is a schematic diagram of an example of a computing device for performing functions described herein.

FIG. 5 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as graphics driver 122, tracking application 126, and/or components thereof, display drivers, etc., as described herein, and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices. For example, communications component 502 can carry communications between tracking application 126 and a GPU on another device, between distributed components of tracking application 126, etc.

Additionally, computing device 100 may include a data store 504, which can be any suitable combination of hardware and/or software, that provides for mass storage of information, databases, and programs employed in connection with examples described herein. For example, data store 504 may be or may include a data repository for applications and/or related parameters not currently being executed by processor 104. In addition, data store 504 may be a data repository for an operating system, application, such as graphics driver 122, tracking application 126, and/or components thereof, display driver, etc. executing on the processor 104, and/or one or more other components of the computing device 100.

Computing device 100 may also include a user interface component 506 operable to receive inputs from a user of computing device 100 and further operable to generate outputs for presentation to the user (e.g., via display interface 116 to a display device). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface 116, a speaker, a haptic feedback mechanism, a printer, any other mechanism capable of presenting an output to a user, or any combination thereof. In an example, user interface component 506 can display or can include interface 400 or similar interfaces to display memory usage information, as described herein.

Computing device 100 can also include a GPU 114, as described herein, for rendering images based on ray tracing instructions received from processor 104. GPU 114 can additionally send signals via a display interface 116 to cause display of the rendered images on a display (not shown). Additionally, computing device 100 may include a graphics driver 122, as described herein, to provide GPU-specific commands for rasterizing, ray tracing, etc., images, as described herein. Additionally, computing device 100 may include a tracking application 126, as described herein, to track and/or display GPU performance based on GPU architecture deduced from architectural data 132.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for indicating resource utilization by a graphics processing unit (GPU), comprising:
   requesting, from a graphics driver specific to the GPU, data indicating a hierarchy of architectural units for executing processing threads on the GPU, wherein the data indicating the hierarchy of architectural units specifies multiple layers of architectural units relating to a plurality of single instruction multiple data (SIMD) modules and includes labels for the multiple layers of architectural units;
   obtaining, based on requesting the data, the data from the graphics driver;
   displaying, via an interface and based on obtaining the data from the graphics driver, indications representative of the hierarchy of architectural units including the multiple layers of architectural units, wherein the indications include the labels for the multiple layers of architectural units;

receiving an indication of a slot, which is one of multiple slots concurrently executed by a single instruction multiple data (SIMD) module, assigned to a collection of threads for executing on the GPU, wherein the SIMD module is capable of concurrently executing multiple collections of threads;

determining, based on the data indicating the hierarchy of architectural units and based on the indication of the slot, a first architectural unit of a first layer of the multiple layers to which the slot is assigned, wherein the first architectural unit is the SIMD module;

determining, based on the data indicating the hierarchy of architectural units, a second architectural unit of a second layer of the multiple layers that includes the first architectural unit; and highlighting, via the interface and based on the determining the first architectural unit and the determining the second architectural unit, a first indication of the indications representing the first architectural unit as executing the collection of threads and a second indication of the indications representing the second architectural unit that includes the first architectural unit.

2. The method of claim 1, wherein receiving the information comprises receiving information of multiple slots assigned to a plurality of collections of threads, wherein determining the first architectural unit comprises determining, for each of the multiple slots and based on the data indicating the hierarchy of architectural units, the corresponding architectural unit to which the slot is assigned, and wherein highlighting the first indication is part of highlighting multiple ones of the indications of each of the corresponding architectural units.

3. The method of claim 1, wherein the data indicates the multiple layers of architectural units where a last layer includes SIMD modules of the GPU, including the SIMD module.

4. The method of claim 3, wherein the multiple layers include at least a computational unit layer that includes a plurality of SIMD modules, and an engine layer that includes one or more computational unit layers.

5. The method of claim 4, wherein determining the first architectural unit comprises determining the SIMD module, a computational unit from the computational unit layer that includes the SIMD module, and an engine from the engine layer that include the computational unit.

6. The method of claim 1, wherein displaying the indications comprises displaying, based on the data indicating the hierarchy of architectural units, a representation of the hierarchy of architectural units that includes one or more labels for one or more of the hierarchy of architectural units as indicated in the data.

7. The method of claim 1, further comprising executing a playback of GPU rendering instructions, wherein receiving the information of the slot comprises receiving the information during the playback based on executing the collection of threads.

8. A computing device for indicating resource utilization by a graphics processing unit (GPU), comprising:
a memory storing one or more parameters or instructions for executing an operating system and one or more applications including a tracking application; and
at least one processor coupled to the memory, wherein the at least one processor is configured to:
request, from a graphics driver specific to GPU, data indicating a hierarchy of architectural units for executing processing threads on the GPU, wherein the hierarchy of architectural units specifies multiple layers of architectural units relating to a plurality of single instruction multiple data (SIMD) modules and includes labels for the multiple layers of architectural units;

obtain, based on requesting the data, the data from the graphics driver;

display, via an interface and based on obtaining the data from the graphics driver, indications representative of the hierarchy of architectural units including the multiple layers of architectural units, wherein the indications include the labels for the multiple layers of architectural units;

receive an indication of a slot, which is one of multiple slots concurrently executed by a single instruction multiple data (SIMD) module, assigned to a collection of threads for executing on the GPU, wherein the SIMD module is capable of concurrently executing multiple collections of threads;

determine, based on the data indicating the hierarchy of architectural units and based on the indication of the slot, a first architectural unit of a first layer of the multiple layers to which the slot is assigned, wherein the first architectural unit is the SIMD module;

determine, based on the data indicating the hierarchy of architectural units, a second architectural unit of a second layer of the multiple layers that includes the first architectural unit; and highlight, via the interface and based on the at least one processor determining the first architectural unit and based on the at least one processor determining the second architectural unit, a first indication of the indications representing the first architectural unit as executing the collection of threads and a second indication of the indications representing the second architectural unit that includes the first architectural unit.

9. The computing device of claim 8, wherein the at least one processor is configured to receive the information at least in part by receiving information of multiple slots assigned to a plurality of collections of threads, wherein the at least one processor is configured to determine the first architectural unit at least in part by determining, for each of the multiple slots and based on the data indicating the hierarchy of architectural units, the corresponding architectural unit to which the slot is assigned, and wherein the at least one processor is configured to highlight the first indication as part of highlighting multiple ones of the indications of each of the corresponding architectural units.

10. The computing device of claim 8, wherein the data indicates the multiple layers of architectural units where a last layer includes SIMD modules of the GPU, including the SIMD module.

11. The computing device of claim 10, wherein the multiple layers include at least a computational unit layer that includes a plurality of SIMD modules, and an engine layer that includes one or more computational unit layers.

12. The computing device of claim 11, wherein determining the first architectural unit comprises determining the SIMD module, a computational unit from the computational unit layer that includes the SIMD module, and an engine from the engine layer that include the computational unit.

13. A non-transitory computer-readable medium, comprising code executable by one or more processors for indicating resource utilization by a graphics processing unit (GPU), the code comprising code for:
request, from a graphics driver specific to the GPU, data indicating a hierarchy of architectural units for executing processing threads on the GPU, wherein the hierarchy of architectural units specifies multiple layers of architectural units relating to a plurality of single instruction multiple data (SIMD) modules and includes labels for the multiple layers of architectural units;

obtaining, based on requesting the data, the data from the graphics driver;

displaying, via an interface and based on obtaining the data from the graphics driver, indications representative of the hierarchy of architectural units including the multiple layers of architectural units, wherein the indications include the labels for the multiple layers of architectural units;

receiving an indication of a slot, which is one of multiple slots concurrently executed by a single instruction multiple data (SIMD) module, assigned to a collection of threads for executing on the GPU, wherein the SIMD module is capable of concurrently executing multiple collections of threads;

determining, based on the data indicating the hierarchy of architectural units and based on the indication of the slot, a first architectural unit of a first layer of the multiple layers to which the slot is assigned, wherein the first architectural unit is the SIMD module;

determining, based on the data indicating the hierarchy of architectural units, a second architectural unit of a second layer of the multiple layers that includes the first architectural unit; and highlighting, via the interface and based on the determining the first architectural unit and the determining the second architectural unit, a first indication of the indications representing the first architectural unit as executing the collection of threads and a second indication of the indications representing the second architectural unit that includes the first architectural unit.

14. The non-transitory computer-readable medium of claim 13, wherein the code for receiving receives information of multiple slots assigned to a plurality of collections of threads, wherein the code for determining the first architectural unit determines, for each of the multiple slots and based on the data indicating the hierarchy of architectural units, the corresponding architectural unit to which the slot is assigned, and wherein the code for highlighting highlights multiple indications of each of the corresponding architectural units.

15. The non-transitory computer-readable medium of claim 13, wherein the data indicates the multiple layers of architectural units where a last layer includes SIMD modules of the GPU, including the SIMD module.

\* \* \* \* \*